(No Model.)
F. E. PARSONS & F. F. PRICKETT.
FENCE.
No. 415,420. Patented Nov. 19, 1889.
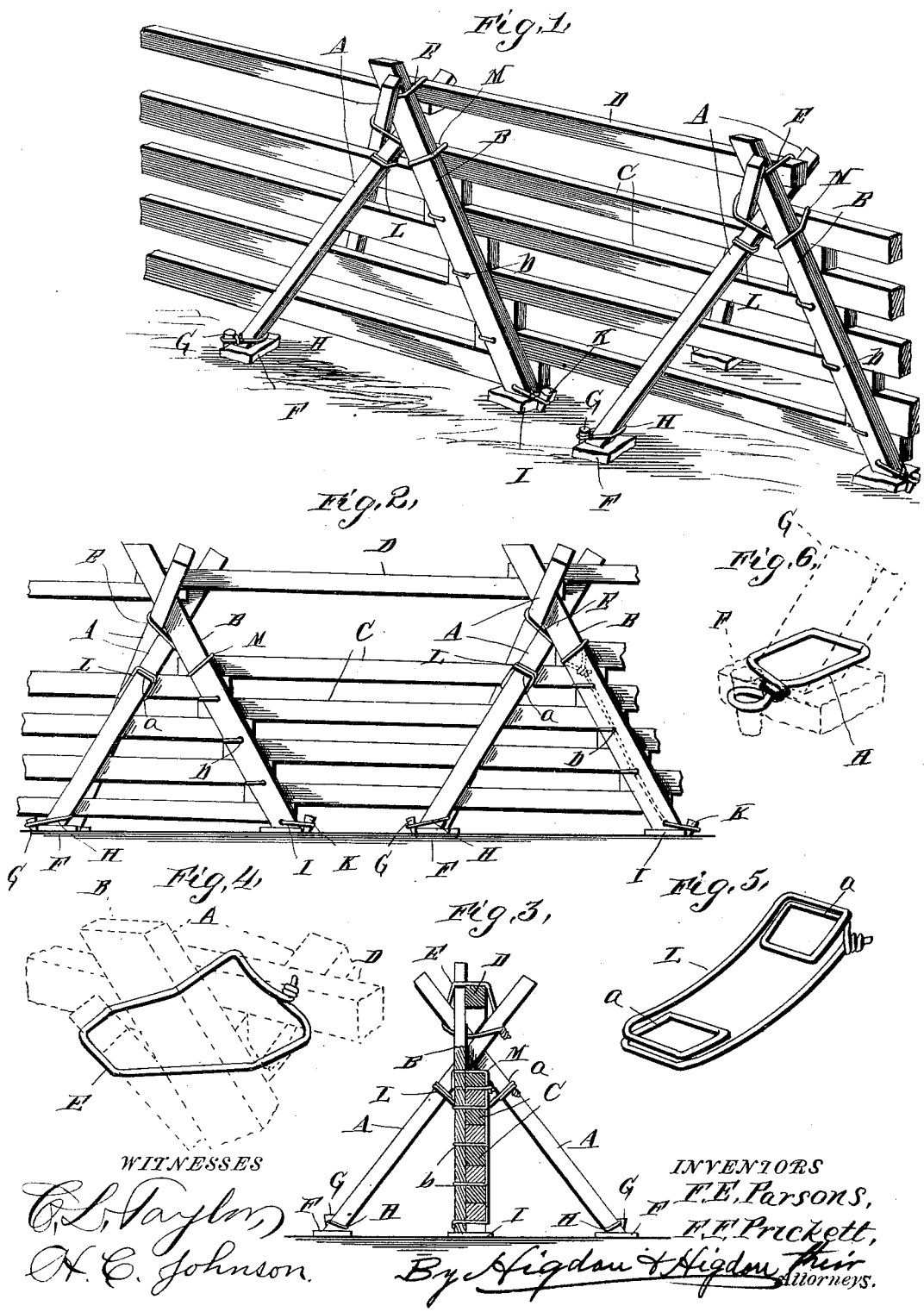

UNITED STATES PATENT OFFICE.

FRANKLIN E. PARSONS AND FERNANDO F. PRICKETT, OF RIVESVILLE, WEST VIRGINIA.

FENCE.

SPECIFICATION forming part of Letters Patent No. 415,420, dated November 19, 1889.

Application filed June 24, 1889. Serial No. 315,369. (No model.)

*To all whom it may concern:*

Be it known that we, FRANKLIN E. PARSONS and FERNANDO F. PRICKETT, citizens of the United States, residing at Rivesville, in the county of Marion and State of West Virginia, have invented certain new and useful Improvements in Fences; and we do hereby declare the following to be a full, clear, and exact description of the invention, such as will enable others skilled in the art to which it appertains to make and use the same.

Our invention relates to an improvement in fences; and it consists in the peculiar construction and combination of devices, that will be more fully set forth hereinafter, and particularly pointed out in the claim.

In the accompanying drawings, Figure 1 is a perspective view of a fence embodying our improvements. Fig. 2 is a side elevation of a portion of the same. Fig. 3 is a transverse sectional view of the same, taken on the line $x\ x$ of Fig. 2. Fig. 4 is a perspective view of the wire loop to secure the crossed stakes and rider-rails together. Fig. 5 is a similar view of the wire loop to connect the crossed stakes together. Fig. 6 is a similar view of the loop to secure the crossed stakes to the anchor-stakes.

In the construction of our improved fence we employ the pairs of crossed stakes A, the lever-stakes B, the rails C, and the rider-rails D. The pairs of crossed stakes A are all inclined in the same direction, as shown, and above the crotches thereof are placed the ends of the rider-rails D, the latter being overlapped. Wires E are then looped around the pairs of stakes A and above and below the lapped ends of the rider-stakes, the ends of the said looped wires being twisted together, so as to secure them. Between each of said wire loops E and the upper ends of each pair of stakes A is inserted the upper end of a lever-stake B. These lever-stakes are arranged in vertical planes in line with the rails, and are also inclined in opposite directions from the crossed stakes A. On forcing the outer ends of the lever-stakes down to the ground the loops E are tightened, so as to draw the stakes and rider-rails more tightly together, as will be understood.

The pairs of stakes A and lever-stakes B are arranged at such angles with relation to each other that they form perfect tripods, and thus serve to secure and brace the fence so strongly that it is not liable to be overturned by the wind. The crossed stakes brace the fence against lateral movement in either direction, and owing to the fact that the crossed stakes and lever-stakes are inclined in opposite directions the same serve to effectually brace the fence against longitudinal movement. The lower ends of the stakes A rest on blocks of stone F to prevent them from decaying, and thereby enhance the durability of the fence. Anchor-stakes G are driven into the ground beyond the outer sides of the said stone blocks, and the upper ends of the anchor-stakes are secured to the lower ends of the crossed stakes by means of wire loops H. The lower ends of the lever-stakes also rest upon blocks of stone I to preserve them from decay, and at the outer sides of the said blocks are anchor-stakes K, which are driven into the ground. The rails C are arranged on one side of the lever-stakes B and have their ends lapped over each other at points in line with said lever-stakes, as shown, the uppermost of the said rails C being directly under and in contact with the crotches of the crossed stakes A. Wires L are doubled and have loops $a$ formed in them, which pass around the stakes A, the intermediate portions of the said wires serving to connect the pairs of crossed stakes and to pass under the uppermost rails C and lash them securely in the crotches of the said crossed stakes. The ends of the wires L are twisted together. Through the lever-stakes B are made openings $b$ in line with the spaces between each pair of rails C. Wires M have one end attached to the anchor-stakes K, are then passed through the lowermost openings $b$ around the lowermost pairs of rails C, then through the next adjacent openings $b$, then partly around the lever-stakes, and then around the next pair of rails C, the said wires being thus doubled between each pair of rails and serving to bind the same very securely to the lever-stakes. When all of the rails have been thus treated, the upper ends of the wires are passed between the two uppermost rails and twisted or coiled around themselves, as shown clearly in Figs. 2 and 3. The anchor-stakes are set at right angles to their respective fence-stakes, and, being secured to the lower ends thereof in the manner stated, serve to effectually prevent the fence-stakes from being moved laterally or raised from the ground by the wind.

A fence thus constructed is exceedingly simple, is very strong and durable, and is inexpensive. We contemplate constructing such fences with material that has been used for the common worm-fences, as we can employ the same very economically.

Having thus described our invention, we claim—

The fence comprising the crossed stakes A and inclined stakes B, forming tripods, said stakes B having the openings b, the anchor-stakes K at the lower ends of the stakes B, the rails C, arranged and having their joints lapped on the stakes B, the wires M, with their lower ends attached to stakes K, then passed through the openings b and around and between the pairs of rails C in succession, the upper ends of said wires being twisted, the rider-rails D, arranged in the crotches of the crossed stakes A, the wires E, lashing said rider-rails to said crossed stakes, and the wires L, having the loops a, encircling the pairs of crossed stakes, said wires passing under the uppermost rails C, all arranged substantially as described.

In testimony whereof we affix our signatures in presence of two witnesses.

FRANKLIN E. PARSONS.
FERNANDO F. PRICKETT.

Witnesses:
ABEL KUHN,
E. S. CARPENTER.